J. E. ROGERS.
ANTISKID DEVICE.
APPLICATION FILED MAR. 31, 1919.
1,328,298.
Patented Jan. 20, 1920.
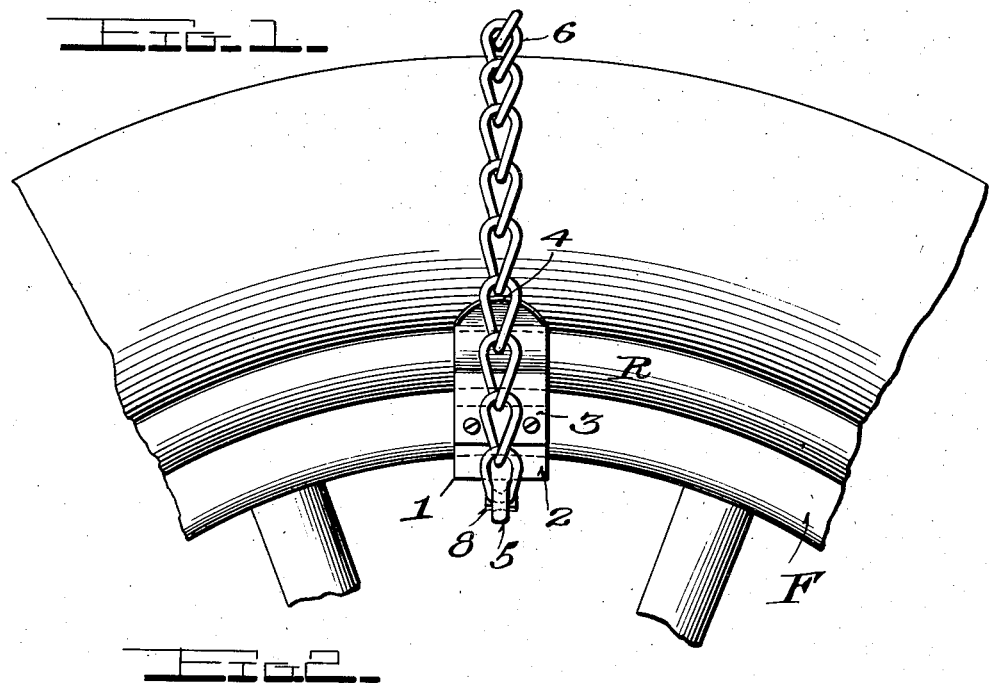
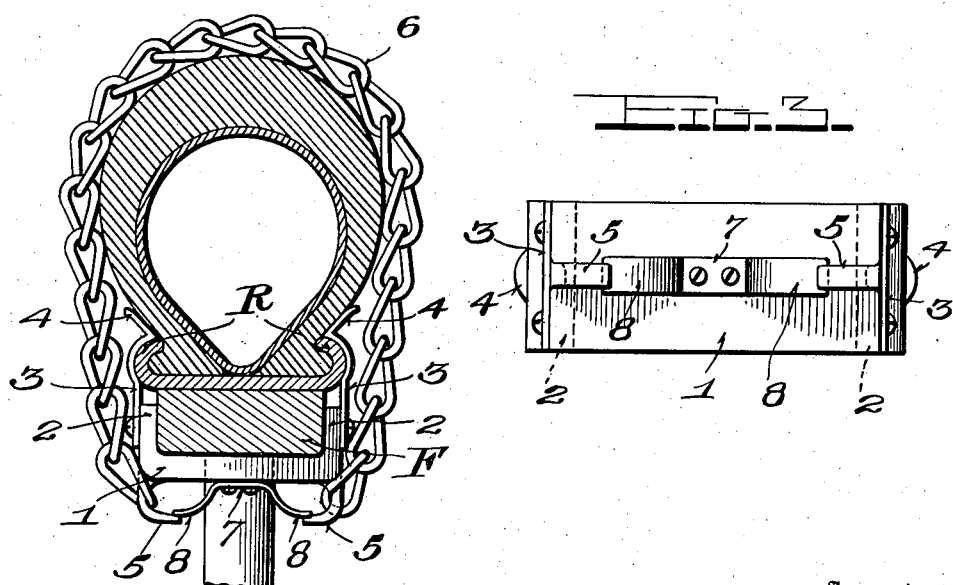
Inventor
J. E. Rogers.
By
Attorney

UNITED STATES PATENT OFFICE.

JAMES EDGAR ROGERS, OF DANBURY, CONNECTICUT, ASSIGNOR OF ONE-THIRD TO PAUL U. SUNDERLAND, OF DANBURY, CONNECTICUT.

ANTISKID DEVICE.

1,328,298.     Specification of Letters Patent.     Patented Jan. 20, 1920.

Application filed March 31, 1919. Serial No. 286,421.

*To all whom it may concern:*

Be it known that I, JAMES EDGAR ROGERS, a citizen of the United States, residing at the city of Danbury, in the county of Fairfield and State of Connecticut, have invented certain new and useful Improvements in Antiskid Devices; and I do declare the following to be a full, clear, and exact description of the invention, such as will enable others skilled in the art to which it appertains to make and use the same.

This invention relates to certain new and useful improvements in anti-skid devices, and the primary object of the invention is to provide a device of this character which can be easily and quickly applied to the wheel by merely forcing same with the hands over the felly or wheel rim, following which the chain can be as easily and quickly snapped into engagement with the securing means therefor.

The invention, briefly, contemplates a device which has one or preferably two springs, that snap into engagement with the tire rim and is held in engagement therewith not only by virtue of the spring or springs, but also by a chain which extends transversely about the tire and engages over the springs, the chain ends being snapped into engagement with fastening devices carried by the device.

Further and other objects of the invention will be later herein set forth and manifested.

In the drawings:

Figure 1, is a side elevation of a fragment of a wheel showing the invention applied thereto;

Fig. 2, is a vertical sectional view of Fig. 1; and

Fig. 3, is a bottom plan view of the device detached from the wheel.

In proceeding in accordance with the present invention, a substantially U-shaped member or base 1, is employed, the side arms 2 of which embrace the opposite sides of the wheel felly F. This member may be positioned at any point desired upon the felly between the spokes of the wheel, and obviously as many of the devices as may be found necessary or desired, can be used.

Preferably, a spring 3, or spring arm, is rigidly secured at its inner end to the respective arms 2, 2, of the member 1, the outer ends of the spring arms being shaped so as to snap over the flanges R, of the tire rim and to snugly engage and conform thereto, as Fig. 2, of the drawings illustrates. The outer terminals 4 of the spring arms extend outwardly of the tire and act as finger grips or means whereby upon engagement with a sharp instrument, the springs may be moved outwardly so as to disengage from the rim flanges R, to allow of removal of the device from the wheel.

The under or inner face of the member 1, is provided with a pair of fingers 5, 5, which latter curve inwardly toward each other and engage the respective ends of a cross-chain 6, being held against accidental disengagement from the fingers by the ends of a preferably one-piece spring 7. These ends 8, 8, of the spring 7, curve toward and engage the ends of the fingers 5, 5, and are spaced from the member 1, so that the ends of the chain 6, may be easily and quickly engaged over the respective fingers 5, 5, and will dislodge the ends 8, 8, of spring 7, whereupon the ends 8, 8, will return to normal position preventing accidental disengagement of the chain ends from the fingers. The spring 7, may be riveted, as shown at its center to the member 1, or otherwise suitably secured.

In operation, it is merely necessary to force the member 1, over the felly so as to cause the spring arms 3, 3, to snap over the rim flanges R, and to then apply the cross-chain as above described, by placing the ends thereof over the fingers 5, 5. It will also be apparent from the foregoing and by reference to Fig. 2, that since the free terminals 4 of the spring arms 3, lie adjacent to the chain, the latter will act to prevent any possible disengagement of these terminals, and consequently of the device from the wheel felly. Preferably, the spring arms are formed so as to securely grip the wheel rim flanges so that if desired but one spring arm 3, can be employed, and in addition, if desired the member 1, may be left on the wheel after removal of the cross-chain, so as to not require replacement of the member 1, upon replacement of the cross-chain.

What is claimed is:

1. In an anti-skid device, a relatively solid and substantial U-shaped member formed to embrace the wheel felly, a relatively thin and wide independent spring arm having one end engaged with the outer side face of one of the arms of the U-member, means to secure said end of the spring arm to said arm of the U-member, the opposite end of said spring arm being free and projecting beyond said arm of the U-member, said free end of the spring arm being shaped to engage over the tire rim and with a side of the tire and having its terminal extending outwardly to form a finger grip or the like, and a tread member connected to the U-member and disposed in part over the spring arm and terminal of the latter.

2. In an anti-skid device, a relatively solid and substantial U-shaped member formed to embrace the wheel felly, a relatively thin and wide independent spring arm having one end engaged with the outer side face of one of the arms of the U-member, means to secure said end of the spring arm to said arm of the U-member, the opposite end of said spring arm being free and projecting beyond said arm of the U-member said free end of the spring arm being shaped to engage over the tire rim and a tread member connected to the U-member and disposed in part over the spring arm.

In testimony whereof I affix my signature.

J. EDGAR ROGERS.